United States Patent
Iliopulos et al.

[15] 3,674,748
[45] July 4, 1972

[54] POLYESTERS CONTAINING AMINOALKYLPHOSPHONATES

[72] Inventors: Miltiadis I. Iliopulos, Vienna, W. Va.; Raymond R. Hindersinn, Lewiston, N.Y.

[73] Assignee: Borg-Warner Corporation, Chicago, Ill.

[22] Filed: Dec. 22, 1969

[21] Appl. No.: 887,361

Related U.S. Application Data

[62] Division of Ser. No. 714,370, Nov. 9, 1967, abandoned, which is a division of Ser. No. 158,877, Dec. 12, 1961, Pat. No. 3,385,914.

[52] U.S. Cl.................260/75 P, 117/124 E, 117/126 AB, 117/126 GR, 117/138.8 A, 117/161 K, 117/161 KP, 117/161 UN, 161/194, 161/205, 161/231, 161/233, 260/2.5 AZ, 260/2.5 AK, 260/37 N, 260/40 R, 260/40 TN, 260/75 N, 260/75 NN, 260/75 AQ, 260/478, 260/835, 260/842, 260/861, 260/870

[51] Int. Cl...............C08g 17/133, C08g 22/10, C08g 22/14

[58] Field of Search..........................260/75 P, 75

[56] References Cited

UNITED STATES PATENTS 3,076,010  1/1963  Beck et al...........................260/461
3,440,222  4/1969  Walsh et al............................260/75

*Primary Examiner*—William H. Short
*Assistant Examiner*—L. L. Lee
*Attorney*—William S. McCurry and Roger A. Schmiege

[57] ABSTRACT

Selected phosphorus compounds, carbonyl compounds and alkanolamines are reacted to produce compounds of the formula:

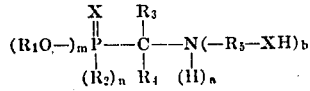

wherein $m$ and $n$ are zero to two and $m + n$ equals two; $a$ is zero to 1, $b$ is 1 to 2 and $a + b$ equals 2; X is oxygen or sulfur; $R_1$, $R_2$, $R_3$, and $R_4$ are organic radicals and $R_3$ and $R_4$ can also be hydrogen, and $R_5$ is an alkyl group. Such compounds can be reacted with carboxylic compounds to produce polyesters, or with epoxides to form polyethers. Such polyesters and polyethers, as well as the compounds themselves, can be reacted with isocyanates to produce polyurethane compositions. When the reaction is carried out in the presence of a foaming agent, cellular products are produced.

4 Claims, No Drawings

POLYESTERS CONTAINING AMINOALKYLPHOSPHONATES

REFERENCE TO PRIOR APPLICATIONS

This is a division of copending application Ser. No. 714,370, filed Nov. 9, 1967, now U.S. Pat. No. 3,501,421, which is a division of copending application Ser. No. 158,877, filed Dec. 12, 1961, now U.S. Pat. No. 3,385,914.

This invention relates to novel phosphorus-containing polyesters which products are useful as binders, casting resins, laminating resins, and coating compositions.

In accordance with this invention there are provided polyesters of components comprising a polycarboxylic compound and a polyhydric alcohol, having chemically combined therein a compound of the formula:

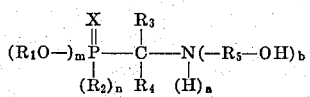

wherein $m$ and $n$ are zero to 2, and $m+n$ equals 2; $a$ is zero to 1, $b$ is 1 to 2, and $a+b$ equals 2; $R_1$ and $R_2$ are alkyl, cycloalkyl, alkenyl, aryl, alkylaryl or halogen-substituted organic radicals of the foregoing group; $R_3$ and $R_4$ are hydrogen, alkyl, cycloalkyl, alkenyl, aryl, alkylaryl, arylalkyl or halogen-substituted radicals of the foregoing group, $R_5$ is alkyl, and X is oxygen or sulfur. The preferred phosphorus compounds of the invention have the formula:

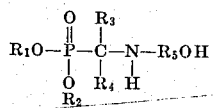

Most preferred as the phosphorus compound is the compound dimethyl-N-(2'2-aminoisopropyl-2-phosphonate.

This invention relates to novel phosphorus-containing monomers that are capable of being polymerized to useful products. In other aspects, the invention relates to novel phosphorus-containing polymers such as polyesters.

It is known that polymers can be rendered fire-resistant by incorporating phosphorus therein. However, it is most desirable to chemically combine the phosphorus into the polymer to prevent the loss of phosphorus by leaching or weathering of the polymer. In the past, phosphorus-containing polymers have been prepared as esters of various phosphorus acids wherein the phosphorus ester linkages formed the back-bone of the polymers. This approach has not been completely successful because of the tendency of the phosphorus ester to hydrolyze in the presence of water, which phenomenon results in the degradation of the polymer and the loss of its valuable physical properties. Hence there is a need to overcome these difficulties, and yet produce useful polymers with inexpensive materials.

Accordingly, it is an object of this invention to produce polymers that are both fire-resistant and have good hydrolytic stability. It is another object of the invention to produce novel monomers that are capable of polymerizing to produce such polymers. It is a further object to produce novel polyesters that contain phosphorus which are useful in the preparation of castings, laminates, and reinforced plastic articles. Still other objects and advantages of the present invention will be apparent to those skilled in the art upon consideration of the following detailed description.

These and other objects are satisfied by providing novel compositions having the following chemical structure:

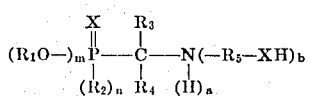

wherein $m$ and $n$ have a numerical value of zero through 2 and $m+n$ equals 2; $a$ has a value of zero or 1, $b$ has a value of 1 or 2, and $a+b$ equals 2; X is oxygen or sulfur; $R_1$, $R_2$, $R_3$, $R_4$ are organic radicals selected from the group consisting of alkyl, cycloalkyl, alkenyl, aryl, alkylaryl, arylalkyl, and halo-substituted organic radicals of the foregoing group; and $R_3$ can also be hydrogen, and $R_5$ is an alkyl group.

These hydroxyl-containing monomers can be reacted with carboxylic compounds to produce polyesters. When the polyesters are unsaturated they can be cross-linked to form thermosetting polymers by reaction with ethylenically unsaturated monomers and/or in the presence of free radical catalysts.

The novel monomers of the invention are produced by reacting together an organic compound, a carbonyl compound and a primary or secondary amine. The organic phosphites that can be used in the invention are those having the chemical formula:

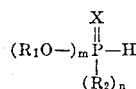

wherein $m$, $n$, $R_1$, $R_2$ and X are as defined hereinbefore. Among the preferred phosphorus compounds for use in practicing the invention are lower alkyl phosphites such as dimethyl phosphite and lower alkenyl phosphites such as diallyl phosphite. Other specific phosphites that can be used are those wherein the radicals $R_1$ and $R_2'$ are methyl, ethyl, isopropyl, butyl, hexyl, n-octyl, 2-ethyl-hexyl, decyl, hexadecyl, phenyl, benzyl, tolyl, cyclohexyl, allyl, crotonyl, beta-chloroethyl, beta-bromoethyl, and mixtures thereof.

In general, the length of the carbon chains or number of carbon atoms in the aryl nuclei of the organic radicals of the phosphorus compounds is not critical, and can vary over wide ranges. The lower limit is the lowest possible number of carbon atoms such as one carbon atom in the alkyl groups and six carbon atoms in the aryl groups, and the upper limit is practical in nature. However, a higher percent by weight of phosphorus may be incorporated in the polymer in instances where the organic radicals attached to the phosphorus atoms are of minimum length, and thus the carbon atoms in the organic radicals $R_1$ and $R_2$ preferably should contain from one to about six to eight carbon atoms.

The carbonyl compounds are preferably aldehydes and ketones. The preferred aldehydes are those containing not more than eight carbon atoms. Suitable compounds of this class are formaldehyde, acetaldehyde, propionaldehyde butyraldehydes, benzaldehydes, 2-ethylhexanal, ethylbutyraldehyde, heptaldehyde, and the like. The ketones that are useful in the invention have the structural formula:

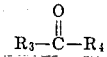

The organic radicals $R_3$ and $R_4$ are groups such as methyl, ethyl, isopropyl, butyl, hexyl, n-octyl, 2-ethylhexyl, phenyl, benzyl, tolyl, cyclohexyl, allyl, and mixtures thereof. It is generally preferred that the number of carbon atoms in each organic radical $R_3$ and $R_4$ does not exceed eight.

The preferred amines are those having the structural formula:

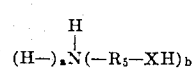

wherein $a$ has a value of zero or 1, $b$ has a value of 1 or 2, and $a+b$ equals 2, X is oxygen or sulfur and the organic radical $R_5$ is an alkyl group having not more than eight carbon atoms. Typical amines for use in preparing the compounds of the invention are ethanolamine, 2-aminopropanol, 3-aminopropanol, 2-aminobutanol, 3-aminobutanol, 4-aminobutanol, di(2-propanol)amine, di(3-propanol) amine, di(2-butanol)amine, di(3-butanol)amine, di(4-butanol)amine, and the like.

In the preparation of the polyfunctional monomers of this invention, it is preferred to maintain the reaction temperature at a low level in order to inhibit the polymerization of the monomer products. Generally, it is preferred that the reaction temperature be less than 80° C, and preferably less than 50° C. The reaction can be carried out in the presence of a solvent, if desired, the only requirement being that the solvent is not reactive with respect to any of the reactants. Suitable solvents are alcohols, such as methanol, isopropanol, butanol and the like; ethers such as diethyl ether, and dioxane, and hydrocarbons such as hexane, heptane, octane, benzene, and cyclohexane.

The following examples illustrate the preparation of the monomers of the invention.

EXAMPLE 1 a. Preparation of dimethyl-N-(2'-hydroxyethyl)-2-aminoisopropyl-2-phosphonate

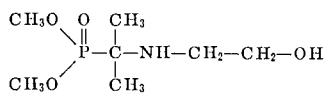

Twenty-two grams of dimethylhydrogenphosphite, 12.2 grams of ethanolamine and two hundred milliliters of methanol were mixed to yield a homogeneous solution. Anhydrous sodium sulfate (50.0 grams), was added to the solution. A solution of 11.6 grams of acetone in fifty milliliters of absolute methanol was added dropwise over a period of approximately 10 minutes to keep the temperature of the reaction mixture under 50° C. The hot mixture was stirred for about 2 hours at room temperature until the temperature of the reaction was 25° C. The drying agent was filtered off and the solvent was evaporated.

The yield of crude material was eighty-nine to ninety-five percent. The product was an almost odorless, colorless oil.
Anal. Calcd. for $C_7H_{18}НО_4P$: P, 14.66 percent
Found: P, 15.0 percent.

b. Preparation and Characterizations of the picrate of dimethyl-N-(2'-hydroxyethyl)-2-aminoisopropyl-2-phosphonate.
Formula:

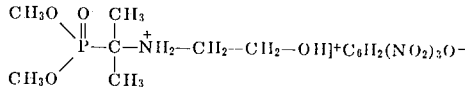

To a solution of 1.83 grams of dimethyl-N-(2'-hydroxyethyl)-2-amino-isopropyl-2-phosphonate in 200 milliliters of anhydrous ether was added with stirring a solution of 3.07 grams of picric acid in four hundred milliliters of ether. A yellowish precipitate formed.

The crude picrate is soluble in alcohols, slightly soluble in benzene and hydrocarbons.

The crude picrate is recrystallized from hot chloroform by adding ether to the cloud point and the cooling the solution to minus twenty degrees centigrade. It can also be recrystallized from ethylacetate ether mixtures. The purified salt, crystallizing as yellow needles, sinters at 127° C and melts at 128.5 to 129° C, (uncorrected) with decomposition.

ANALYSIS PERCENT

Formula: $C_{13}H_{21}N_4O_{11}P$

| Calculated | Found |
|---|---|
| C 35.46 | 35.47 |
| H 4.80 | 4.88 |
| N 12.72 | 12.73 |
| P 7.03 | 6.88 |
|  | 7.04 (flame spectroscopy) |

EXAMPLE 2 a. Preparation of dimethyl-N-(2'-hydroxyethyl)-2-aminoethyl-2-phosphonate.

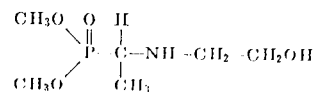

Twenty-two grams of dimethylhydrogenphosphite, 12.2 grams of ethanolamine and 300 milliliters of absolute methanol were mixed to yield a homogeneous solution. Fifty grams anhydrous sodium sulfate were added to the solution and a solution of 8.8 grams of acetaldehyde in 50 milliliters of absolute methanol was then added dropwise with stirring over a period of approximately 10 minutes, to keep the temperature of the reaction mixture under forty degrees centigrade. The hot mixture was stirred for about two hours at room temperature. The drying agent was filtered off and the solvent removed under vacuum.

The crude product obtained in a ninety percent yield was an almost colorless, odorless oil. Phosphorus found, 15.0 percent. (Calculated for $C_6H_{16}O_4NP$): 15.7 percent.

b. Preparation and Characterization of the picrate of dimethyl-N-(2'hydroxyethyl)-2-aminoethyl-2-phosphonate.

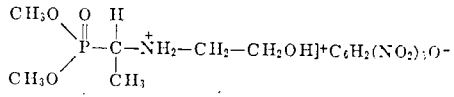

1 2/10 grams of the crude oily dimethyl-N-(2'-hydroxyethyl)-2-aminoethyl-2-phosphonate was completely dissolved in a mixture of 50 parts of ether and 25 parts of methanol by volume. A solution of 3.5 grams of picric acid in a mixture of three hundred cc. of ether and twenty cc. of methanol was then added.

The turbid solution was filtered and the filtrate evaporated to dryness at twenty-five degrees centigrade under sixteen millimeters Hg. The crude picrate was recrystallized twice from hot ethyl-acetate by cooling at minus twenty degrees centigrade.

The yellow crystalline product sinters at 109° C, and melts at 111.5 to 112.5° (uncorrected) with decomposition.

ANALYSIS PERCENT

Formula: $C_{12}H_{19}O_{11}N_4P$

| Calculated | Found |
|---|---|
| C 33.81 | 33.80 |
| H 4.49 | 4.59 |
| N 13.14 | 13.17 |
| P 7.26 | 7.49 |
|  | 7.18 (flame spectroscopy) |

EXAMPLE 3

Using the same general procedure as in the foregoing examples, 15.6 grams of acetone was added portionwise with stirring into a solution of 22.0 grams of dimethyl hydrogen phosphite and 21.02 grams diethanolamine dissolved in 150 milliliters of methanol and containing fifty grams of anhydrous sodium sulfate. The temperature rose to 30° C. during the addition.

The reaction mixture was refluxed for 5 minutes and, after cooling and filtering off the drying agent, the solvent was removed as in Example 1.

The crude product is a very viscous, almost colorless liquid. Phosphorus found: 12.9 percent (Calculated for $C_9H_{22}O_5NP$ 12.13 percent). The compound is named dimethyl-N,N-bis(2-hydroxy-ethyl)-2- aminoisopropyl-2-phosphonate.

EXAMPLE 4

Twenty-two grams of dimethyl phosphite was dissolved in 150 milliliters methanol. To the mixture was added 50 grams anhydrous sodium sulfate and a solution of 11.6 grams of acetone and 25 milliliters of methanol. Thereafter, 12.2 grams of ethanolamine dissolved in 20 milliliters methanol was added dropwise over a period of 4 minutes, during which time the temperature rose to 41° C. The reaction mixture was stirred for several hours and allowed to stand. The sodium sulfate was removed by suction filtration and the solvent evaporated to provide a 95 percent yield of crude product.

EXAMPLE 5

To a mixture of 234.2 grams of diphenyl phosphite and one hundred milliliters methanol was added 61.1 grams of ethanolamine. The temperature rose to 112° C, after which an additional 150 milliliters of methanol were added. The reaction mixture was agitated for nearly 2 hours. To a mixture of two hundred and 47 grams of the resulting solution and 31.5 grams of anhydrous sodium sulfate was added dropwise with agitation over a 6 minute period, a solution of 36.3 grams of acetone and 25 milliliters of methanol. The reaction was allowed to stir for 15 minutes.

EXAMPLE 6

To a mixture of 234.2 grams of diphenylphosphite and 150 milliliters of methanol was added a solution of 72.6 grams of acetone in 50 milliliters of methanol. An additional 50 milliliters of methanol were added to the reaction mixture and after 10 minutes, 63 grams anhydrous sodium sulfate was added. Thereafter 61.1 grams ethanolamine were added dropwise with agitation over a period of 12 minutes. After standing at room temperature for a period of time, the volatiles were evaporated and the crude product weighed 378 grams.

The polyfunctional monomers of this invention readily react with polycarboxylic compounds to form polyesters. The preferred carboxylic compounds are the carboxylic acids, acid halides and acid anhydrides, and mixtures thereof. The carboxylic compounds can be saturated or unsaturated or mixtures thereof depending upon the intended use for the polyesters. Likewise the polycarboxylic compounds can be aliphatic, cycloaliphatic, aromatic or heterocyclic. Illustrative polycarboxylic compounds include the following: phthalic acid, isophthalic acid, terephthalic acid; tetrachlorophthalic acid; maleic acid, dodecylmaleic acid; octadecenylmaleic acid; fumaric acid; aconitic acid; itaconic acid; trimellitic acid; tricarballylic acid; 3,3'-thiodipropionic acid; 4,4'-sulfonyldihexanoic acid; 3-octenedioic-1,7-acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 3-chloro-3,5-cyclohexadiene-1,2-dicarboxylic acid; 8,12-eicosadienedioic acid; 8-vinyl-10-octadecenedioic acid; and the corresponding acid anhydrides, acid chlorides and acid esters, such as phthalic anhydride, phthaloyl chloride, and the dimethyl ester of phthalic acid. The resins can be modified for special properties by using other selected polycarboxylic compounds. For example, 1,4,5,6,7,7-hexachlorobicyclo-(2.2.1)-5-heptene-2,3 -dicarboxylic anhydride or acid and tetrachlorophthalic anhydride or acid can be used to impart additional flame resistance to the composition. The monomers of this invention can also be reacted with monobasic acids, such as acetic acid, propionic acid, butyric acid and the like, to produce esters that are useful as plasticizers.

The esterification or etherification of the phosphorus-containing monomers of this invention can be carried out at elevated temperatures, preferably not over one hundred and fifty degrees centigrade. When polycarboxylic acids are used, the progress of the esterification reaction can be monitored by measuring the quantity of water of esterification that is produced. Small quantities of toluene or xylene can be used as azeotroping agents to facilitate removal of the water. When acid halides are used, it is preferred to use solvents during the reaction. The acid halide can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed such as by stripping at the completion of the reaction. The progress of the reactions involving the acid halides can be monitored by measuring the quantity of hydrogen halide evolved during the course of the esterification. Moreover, in the reactions involving the acid halides, it is often advantageous to use a hydrogen halide acceptor such as amines and strong bases. Preferred acceptors are tertiary amines such as pyridines, and triethylamine.

The unsaturated polyesters produced in accordance with this invention can be cured by cross-linking in the presence of a catalytic amount of a conventional polymerization catalyst for addition polymerization of ethylenically unsaturated materials, including free radical catalysts such as benzoyl peroxide and other organic peroxides. The polymer can also be cured by copolymerization with an ethylenically unsaturated monomeric material copolymerizable therewith, and preferably in the presence of a catalytic amount of a polymerization catalyst such as mentioned above.

The ethylenically unsaturated monomers which can be used in curing or cross-linking the ethylenically unsaturated polymers of the present invention can be varied widely. While other materials can be used, it is preferred that addition polymerization be practiced since no by-product ammonia, water, etc., is formed and the problems resulting therefrom are not experienced. The monomers useful in curing the thermoplastic unsaturated polymers include vinylidene compounds or mixtures thereof capable of cross-linking ethylenically unsaturated polymer chains at their points of unsaturation and usually they contain the reactive group $H_2C = C-$. Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, the diacrylate, dimethacrylate, diethacrylate esters of ethylene glycol, etc. The monomer can be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

In accordance with still other aspects of the invention, it is possible to employ the improved polymers of the invention in the preparation of plastic articles in general, reinforced plastic articles containing a reinforcement such as cloth, glass fibers in the form of roving individual glass fibers, etc., and laminates or other filled resin compositions. Surprisingly, such prepared materials exhibit vastly improved physical properties such as discussed above for the polymers of the invention. Suitable reinforcements or laminations for preparing the reinforced articles and laminates include textile fibers or cloth, glass fibers or cloth, roving, etc. Casting may be prepared from the improved polymers of the present invention and such products likewise have been found to exhibit the improved properties of the polymers discussed above to a surprising degree. In general, well known processes of the prior art may be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as orlon, mineral fibers such as asbestos, natural fibers such as cotton silk and wool, and metallic fibers such as aluminum and steel.

Following are examples of fillers that can be used in the polymers of the invention: inorganic materials such as calcium carbonate, clay and pigments, and organic materials such as wood flour, cotton and rayon flock, sisal fibers and dyes.

It is also within the scope of the invention to bend the phosphorus-containing monomers and the polyesters and polyethers containing the phosphorus-containing compounds of this invention and other hydroxyl-containing materials, such as polyesters. Such additional polyesters are the reaction products of polycarboxylic acids and polyhydric alcohols, The polycarboxylic compounds which can be employed are any of the polycarboxylic compounds disclosed hereinbefore. The preferred polycarboxylic compounds are the aliphatic and cycloaliphatic dicarboxylic acids containing no more than 14 carbon atoms, and the aromatic dicarboxylic acids containing no more than 14 carbon atoms. Polyphenolic compounds which can be employed are the reaction products of phenolic compounds with aldehydes, such as phenol-formaldehyde resins. Illustrative polyhydric alcohols include the following; glycerol; polyglycerol; pentaerythritol; mannitol; trimethylol propane; sorbitol; trimethylolethane; butanediol; pentanediol; 1,2,6-hexanetriol; 2,2,-bis(4-hydroxyphenyl)-propane, and the like. Preferred polyols are the open-chain aliphatic polyhydric alcohols and polyalkylene ether polyols possessing from two to six esterifiable hydroxyl groups and containing no more than 20 carbon atoms.

The following example illustrates the preparation of a novel polymeric composition of a phosphorus-containing compound of this invention.

EXAMPLE 7

A phosphorus-containing polyester was prepared as follows:

A polyester was prepared by reacting ten moles of trimethylolpropane and six moles of adipic acid; the resulting hydroxyl number was five hundred and four. To 500 grams of this polyester was mixed 125 grams of dimethyl-N-(2'-hydroxyethyl)-2-amino-isopropyl-2-phosphonate. The mixture, which was non-homogeneous, was heated and stirred at 110° C. for 4.5 hours under vacuum. Methanol vapor was condensed and recovered from the reaction mixture. The resulting product was clear and had a phosphorus content of about 3.1 percent and a Gardner viscosity of 240 seconds at 50° C.

In instances wherein the phosphorus-containing compounds of this invention are utilized with the hydroxyl-containing polymeric materials such as the polyesters disclosed herein, it is preferred that said hydroxyl-containing polymeric material have a hydroxyl number between 30 and 950.

As shown in the foregoing Example 7, the phosphorus-containing compounds of this invention can be reacted with polyesters, that are the reaction products of polycarboxylic compounds and polyhydric alcohols of the type disclosed hereinbefore, to produce phosphorus-containing polyesters. Hence, it is apparent that while this invention has been described with reference to certain specific embodiments, many variations will be recognized by those skilled in the art that do not depart from the spirit and scope of the invention.

What is claimed is:

1. A polyester produced by the process comprising the reacting at a temperature not over 150° C:
   1. a compound having the formula:

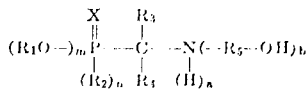

wherein $m$ and $n$ are zero to 2 and $m+n$ equals 2; $a$ is zero to 1, $b$ is 1 to 2 and $a+b$ equals 2; X is oxygen or sulfur; $R_1$ and $R_2$ are alkyl of one to eight carbon atoms, cycloalkyl of three o eight carbon atoms, alkenyl of three to four carbon atoms, aryl of six to eight carbon atoms, alkylaryl of seven to eight carbon atoms, arylalkyl of seven to eight carbon atoms or halo-substituted organic radicals of the foregoing group wherein the halogen is chlorine or bromine, $R_3$ and $R_4$ are hydrogen, alkyl of one to eight carbon atoms, cycloalkyl of three to eight carbon atoms, alkenyl of three to four carbon atoms, aryl of six to eight carbon atoms, alkylaryl of seven to eight carbon atoms, or arylalkyl of seven to eight carbon atoms; and $R_5$ is an alkylene group of one to eight carbon atoms with 11. an hydroxyl terminated polyester which is the reaction product of
      A. a polycarboxylic compound selected from the group consisting of di- and tricarboxylic acids, di- and tricarboxylic acid halides, di- and tricarboxylic acid anhydrides and mixtures thereof and
      B. a polyol selected from the group consisting of open chain aliphatic polyhydric alcohols and polyalkylene ether polyols possessing from 2–6 esterifiable hydroxyl groups and containing up to 20 carbon atoms.

2. The polyester of claim 1 wherein the phosphorus compound has the formula:

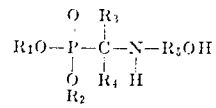

3. The polyester of claim 2 wherein the phosphorus compound is dimethyl-N-(2'-hydroxyethyl)-2-aminoisopropyl-2-phosphonate.

4. The polyester of claim 3 wherein the polycarboxylic compound is adipic acid and the polyhydric alcohol is trimethylolpropane.

* * * * *